United States Patent [19]

Gray

[11] Patent Number: 4,712,668

[45] Date of Patent: Dec. 15, 1987

[54] FLIGHT FOR USE ON A CONVEYOR BELT

[76] Inventor: Ralph Gray, 31-249 Cedarbrae Avenue, Waterloo, Ontario, Canada, N2L 4S8

[21] Appl. No.: 832,355

[22] Filed: Feb. 24, 1986

[51] Int. Cl.⁴ .............................................. B65G 15/42
[52] U.S. Cl. ..................................... 198/698; 198/734
[58] Field of Search ..................... 198/690.2, 698, 699, 198/699.1, 734

[56] References Cited

FOREIGN PATENT DOCUMENTS 579365  7/1959  Canada ........................... 198/690.2

Primary Examiner—Jeffrey V. Nase
Attorney, Agent, or Firm—Daryl W. Schnurr

[57] ABSTRACT

A flight has a wing with an elongated support rod embedded in said wing along a fixed edge thereof. To flight or wing has two free ends that are not affixed to said support rod. A metal cable is embedded in each of the free ends and extends from the free ends to the support rod. The metal cable in affixed to the support rod to reduce the possibility of the free ends breaking off from the remainder of the wing.

6 Claims, 4 Drawing Figures

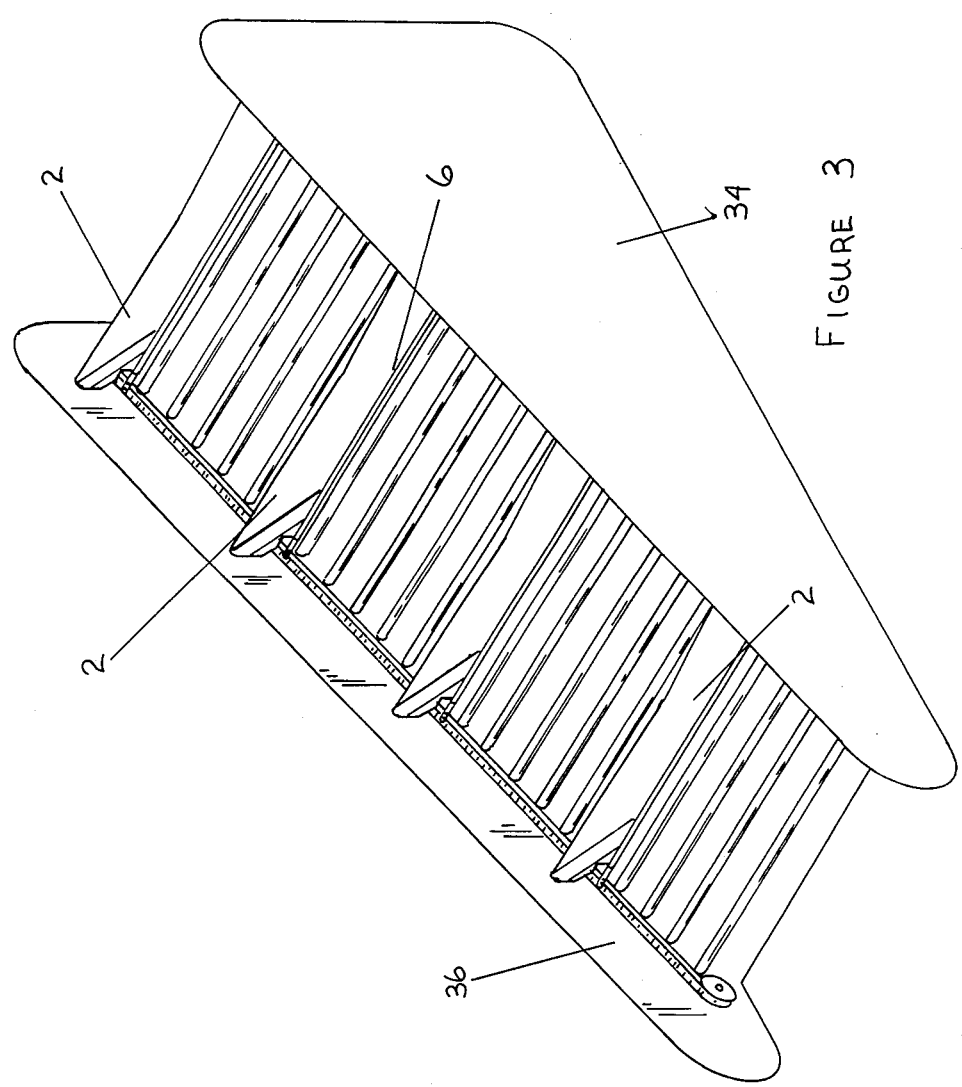

FLIGHT FOR USE ON A CONVEYOR BELT

BACKGROUND OF THE INVENTION

1. Field of the Invention

This invention relates to a flight for use as part of a conveyor belt for agricultural equipment, and in particular, to a flight that has two free ends that are able to move back and forth relative to a support rod of said flight.

2. Description of the Prior Art

Previous flights have a wing with an elongated support rod embedded along a fixed edge of the wing, said rod being exposed at either end of said wing. The wing has two free ends that are able to move back and forth relative to said support rod. The flights are designed to be used in an agricultural conveyor belt so that, when the flight is properly mounted, the wing is normal to the conveyor belt. There are a series of equally spaced flights throughout the conveyor belt so that agricultural products on the conveyor belt can be moved up or down a slope with the flight supporting the product to prevent it from rolling down the slope. It is necessary for the flights to have two free ends so that they can fit properly on the conveyor belt. Unfortunately, with previous flights, as the flights age, the material from which the flights are made can become brittle and the free ends can break off. When this occurs, agricultural product being conveyed on the conveyor belt is able to roll or fall off the flight around either end. If the agricultural product being conveyed is of an appropriate size, it can become wedged in the opening at the free end and be scraped along the wall of the conveyor belt, thereby spoiling the product. Further, when previous flights are used in cold weather, the free ends are more brittle and can break off during use of the conveyor belt. Again, this can cause great inefficiencies in the use of the conveyor belt and also serious damage to the product being conveyed. It is not unusual, with conveyor belts containing flights that are more than two years old, to have the free ends of substantially all of the flights broken off.

SUMMARY OF THE INVENTION

It is an object of the present invention to provide a flight for use as part of a conveyor belt for agricultural equipment, said flight having two free ends that are reinforced so that they will not break off as the flight ages or during normal usage.

A flight for use as part of a conveyor belt for agricultural equipment has an elongated support rod and wing. The wing has one edge that is affixed to said rod throughout most of its length with an opposite edge of said wing being a free edge. The wing is of bendable but reasonably stiff material and is symmetrical about a plane normal to a mid-point of said rod. The wing has two free ends that are not affixed to said rod and are slightly narrower than a remainder of said wing. The free ends are able to move back and forth relative to said rod and each free end is stiffened by a metal cable embedded in reinforcing ribs affixed to said wing and extending at an angle from each free end to said rod. Each metal cable has one end that is affixed to said rod. The rod has means whereby said rod can be affixed to the conveyor belt so that the wing can extend substantially normal and outward relative to said conveyor belt when the flight is in use.

A flight for use as part of a conveyor belt for agricultural equipment has a wing with a free edge and a fixed edge. An elongated support rod is embedded in said wing along the fixed edge for most of its length. The wing has two identical ends that are free of said wing. The wing is made of reasonably stiff, but bendable material, with reinforcing ribs extending from said free end to an area of said wings that is affixed to said rod so that said free ends will be stiffer relative to the remainder of said wing. The rod has means for affixing said flight to said conveyor belt.

BRIEF DESCRIPTION OF THE DRAWINGS

In drawings which illustrate a preferred embodiment of the invention:

FIG. 3 is a partial schematic perspective view of a series of flights mounted in a conveyor belt for agricultural equipment.

DESCRIPTION OF A PREFERRED EMBODIMENT

Figure 1:
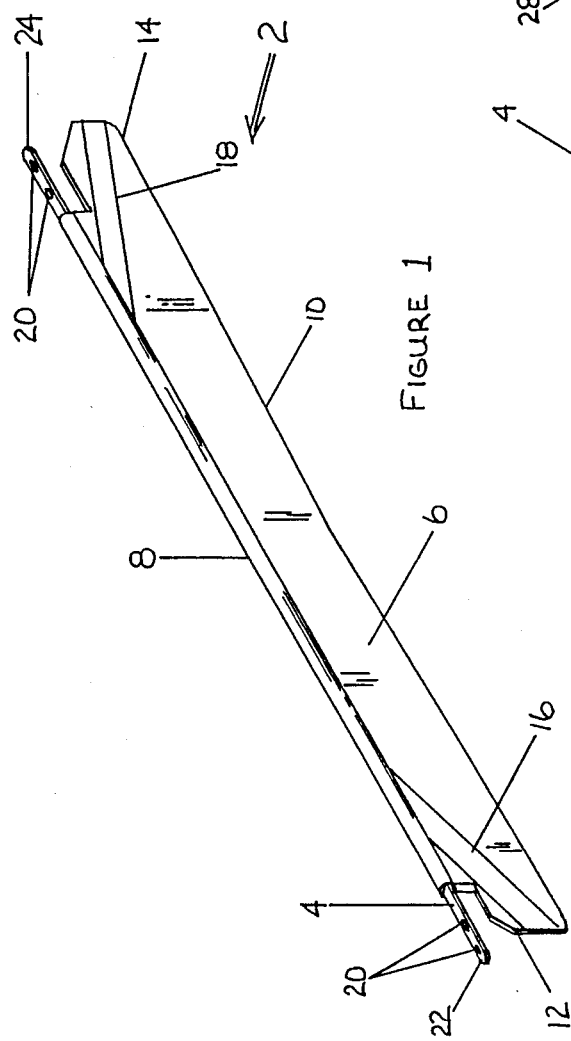
FIG. 1 is a perspective view of a flight in accordance with the present invention.
Figure 4:
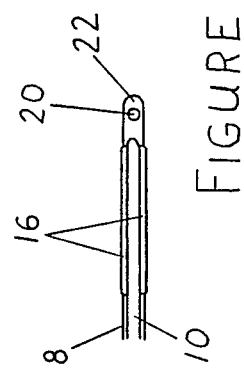
FIG. 4 is a partial edge view of one end of the flight showing the reinforcing ribs.

Referring to FIG. 1 in greater detail, a flight 2 has an elongated support rod 4 and a wing 6, said wing having one edge 8 that is affixed to said rod throughout most of its length and an opposite edge 10 that is a free edge. The wing is made of bendable but reasonably stiff material, preferably, natural rubber. The wing is symmetrical about a plane normal to a mid-point of said rod and has two free ends 12, 14 that are not affixed to said rod 4 and are slightly narrower than a remainder of said wing 6. The free ends 12, 14 are able to move back and forth relative to said rod 4. The free ends 12, 14 are stiffened by reinforcing ribs 16, 18 extending on an angle from said free ends 12, 14 to an area of said wing 6 that is affixed to said rod 4. The rod 4 has openings 20 in either end 22, 24 thereof, said openings 20 providing means whereby said rod can be affixed to a conveyor belt (not shown in FIG. 1).

Figure 2:
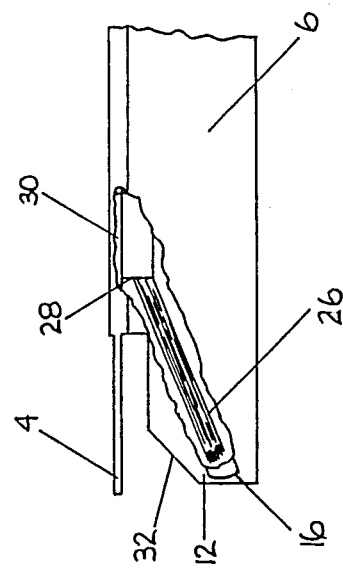
FIG. 2 is a partial side view of one end of the flight with part of the reinforcing rib cut away to expose a metal cable that is clamped onto a support rod.

As can best be seen from FIG. 2, there is a metal cable 26 embedded in each pair of reinforcing ribs 16, 18. The metal cable 26 extends from a free end of said wing 6 at an angle to said rod 4, said cable having one end 28 that is affixed to said rod 4. The end 28 of the metal cable 26 fits within a sleeve 30 that is first welded onto said rod 4 so that it cannot move relative to said rod and then, after the end 28 is placed inside said sleeve 30, said sleeve is clamped onto said rod 4, thereby retaining the end 28 within the sleeve. While only one free end 12 of the wing 6 is shown in FIG. 2, the other end 14 has an identical cable 26 embedded in the same manner in the reinforcing ribs 18. Various other means could be used to attach the cable to the rod.

From FIG. 1, it can be seen that the wing 6 is curved slightly with the free edge 10 being further from the rod 4 at either end than at the mid-point. Each free end 12, 14 has a generally rectangular shape with a corner 32 located nearest to the rod 4 being cut off. In FIG. 3, a plurality of flights 2 are arranged on a conveyor belt 34 of agricultural equipment (not shown) in such a manner that the wing 6 of each flight 2 extends substantially normal and outward relative to said conveyor belt 34. A wall 36 is adjacent to one side of the conveyor belt but has been omitted on the opposite side of the conveyor belt 34 for ease of illustration. In addition, the agricultural equipment, the pulleys or rollers and means for driving the conveyor belt have been omitted.

Preferably, the wing 6 of the present invention is made from natural rubber. Various other suitable materials will be readily apparent to those skilled in the art. It is believed that the present invention will greatly reduce the possibility of the free ends 12, 14 breaking off or permanently bending out of position so that agricultural product being conveyed either slips through the opening, thereby greatly reducing the efficiency of the conveyor belt or, becomes jammed in the opening created by the absence of the free end so that some of the agricultural product becomes seriously and permanently damaged.

What I claim as my invention is:

1. A flight for use as part of a conveyor belt for agricultural equipment, said flight comprising an elongated support rod and wing, said wing having one edge that is affixed to said rod throughout most of its length with an opposite edge of said wing being a free edge, said wing being of bendable but reasonably stiff material, said wing being symmetrical about a plane normal to a midpoint of said rod, said wing having two free ends that are not affixed to said rod and are slightly narrower than a remainder of said wing, said free ends being able to move back and forth relative to said rod, each of said free ends being stiffened by a metal cable embedded in reinforcing ribs affixed to said wing and extending at an angle from each free end to said rod, each metal cable having one end that is affixed to said rod, said rod having means whereby said rod can be affixed to the conveyor belt so that the wing can extend substantially normal and outward relative to said conveyor belt when the flight is in use.

2. A flight as claimed in claim 1 wherein each metal cable is clamped within a sleeve that is in turn clamped on said rod.

3. A flight as claimed in any one of claims 1 or 2 wherein the wing has two sides and there are two reinforcing ribs at each end of said free end, one reinforcing rib being located on each side of said wing and the metal cable is embedded in each pair of reinforcing ribs.

4. A flight as claimed in any one of claims 1 or 2 wherein the wing is curved slightly with the free edge being further from the rod at either end than at the mid-point.

5. A flight as claimed in any one of claims 1 or 2 wherein each free end has a generally rectangular shape with a corner of said end located nearest to the rod being cut off.

6. A flight as claimed in any one of claims 1 or 2 wherein the wing is made of natural rubber.

* * * * *